United States Patent
Paik et al.

(10) Patent No.: US 7,161,096 B2
(45) Date of Patent: Jan. 9, 2007

(54) MASS MEASUREMENT SYSTEM AND METHOD USING INERTIAL FORCE AND STANDARD MASS IN GRAVITY-FREE ENVIRONMENT

(75) Inventors: Hong Yul Paik, Daejeon (KR); Hae Jin Choi, Seoul (KR); Gi Hyuk Choi, Daejeon (KR); Jong Woo Kim, Daejeon (KR); Youn Kyu Kim, Daejeon (KR)

(73) Assignee: Korea Aerospace Research Institute, Daejeon (KR)

( * ) Notice: Subject to any disclaimer, the term of this patent is extended or adjusted under 35 U.S.C. 154(b) by 9 days.

(21) Appl. No.: 11/179,453

(22) Filed: Jul. 12, 2005

(65) Prior Publication Data

US 2006/0011390 A1    Jan. 19, 2006

(30) Foreign Application Priority Data

Jul. 15, 2004    (KR)    ...................... 10-2004-0055190

(51) Int. Cl.
*G01G 9/00*    (2006.01)

(52) U.S. Cl. ............................. 177/1; 177/200; 73/580

(58) Field of Classification Search .................... 177/1, 177/199, 200; 73/580
See application file for complete search history.

(56) References Cited

U.S. PATENT DOCUMENTS

| | | | | |
|---|---|---|---|---|
| 2,767,975 A | * | 10/1956 | Horst et al. .................. | 177/200 |
| 3,555,886 A | * | 1/1971 | Thornton ...................... | 73/580 |
| 3,595,329 A | * | 7/1971 | Withnell et al. ........ | 177/210 R |
| 4,212,361 A | * | 7/1980 | Stocker ....................... | 177/200 |
| 4,611,675 A | * | 9/1986 | Yamanaka ...................... | 177/1 |
| 5,902,964 A | * | 5/1999 | Solberg et al. ................. | 177/1 |
| 6,313,414 B1 | * | 11/2001 | Campbell ..................... | 177/16 |
| 6,450,013 B1 | * | 9/2002 | Gallagher .................. | 73/54.25 |
| 6,550,013 B1 | * | 4/2003 | Gervais et al. ............. | 713/501 |
| 6,727,438 B1 | * | 4/2004 | Stokes ......................... | 177/200 |
| 6,756,548 B1 | * | 6/2004 | Isobe et al. ............ | 177/210 FP |

* cited by examiner

*Primary Examiner*—Randy W. Gibson
(74) *Attorney, Agent, or Firm*—Volpe and Koenig, PC (57) ABSTRACT

The mass measurement system includes a linear acceleration motion unit that is a linear motion driving source, a first load cell fastened to the linear acceleration motion unit to measure an inertial force of a sample caused by linearly accelerated motion of the 10 linear acceleration motion unit, a second load cell fastened to the linear acceleration motion unit while being spaced apart from the first load cell by a predetermined distance, the second load cell measuring an inertial force of a standard sample having a known standard mass caused by the linearly accelerated motion of the linear acceleration motion unit, and a main control unit for calculating and outputting mass of the sample through an arithmetic operation based on the inertial forces, measured by the first and second load cells, and the standard mass, and controlling an entire operation of the system.

18 Claims, 8 Drawing Sheets

MASS MEASUREMENT SYSTEM AND METHOD USING INERTIAL FORCE AND STANDARD MASS IN GRAVITY-FREE ENVIRONMENT

BACKGROUND OF THE INVENTION

1. Field of the invention

The present invention relates, in general, to a mass measurement system in a gravity-free environment and, more particularly, to a mass measurement system and method using inertial force and standard mass in a gravity-free environment, which apply the same linear acceleration both to a sample, which is a measurement object, and a standard sample having a known mass, and utilize only the inertial forces of the sample and standard sample, caused by the applied linear acceleration, and the mass of the standard sample, thus efficiently measuring the mass of the sample.

2. Description of the Related Art

Generally, the inside of a spacecraft traveling in space is in a micro gravity environment having little gravity, or in a gravity-free environment. In order to measure the mass of medicine, material, animal, plant, etc., in such a micro gravity or gravity-free environment, the following methods using a mass measurement device, which is known as a so-called "space mass measuring device", have been proposed.

First, there is a method of connecting a spring or metallic bar to a sample, applying a vibration to the sample, measuring the period of the vibration, and calculating the mass of the sample using a spring mass and metallic mass system. Second, there is a method of linearly accelerating a sample using a constant force, measuring an acceleration and calculating mass. Third, there is a method of rotating a sample and measuring the mass of the sample using the measurement of a centrifugal force.

However, the above-described conventional methods of measuring the mass of a sample, etc., in a gravity-free environment accompany the following problems.

First, the mass calculation method using the spring mass and metallic mass system is problematic in that it is difficult to precisely measure a period due to the damping effect of the system itself, and repetitive measurements must be performed for a long period of time to precisely measure a precise period.

Further, a vibration system itself is a non-linear system, so that it is very difficult to obtain mass from a vibration period, and measurements are subject to error. Therefore, the spring mass and metallic bar mass system currently used in a spacecraft is problematic in that an error of about 1% is caused at the time of measurement, so that it is difficult to perform precise measurement.

Therefore, such a spring mass and bar mass system has been limitedly used for the rough measurement of the mass of an astronaut which does not particularly require precise measurement.

Next, the method of applying a constant force to linearly accelerate a sample, measuring acceleration and obtaining the mass of the sample is problematic in that it is difficult to accurately provide a constant force, and, in addition, it is very difficult to precisely measure acceleration. Therefore, the method of applying a constant force to linearly accelerate a sample, measuring acceleration and obtaining mass is problematic in that there is considerable error due to the imprecision of measurement.

Therefore, the method of applying a constant force to linearly accelerate a sample, measuring acceleration and obtaining mass is also used for the measurement of the rough mass of an astronaut which does not particularly require precise measurement.

Next, the method of rotating a sample and measuring the mass of the sample using the measurement of a centrifugal force is problematic in that the diameter of a system must be large to apply a sufficient centrifugal force, and a signal must be extracted from a rotating shaft, thus complicating a system. Further, there is a problem in that, when an animal, which is a main mass measurement object, is rotated, stress is applied to the animal.

Further, the above-described conventional methods are technologies for approximately measuring mass, and are not suitable for the precise measurement (with an error of 1% or less) of small mass (for example, a mass of 5 kg or less) for space experiments, the importance of which has been recently emphasized.

Further, due to the problems and limitations of the conventional methods, precise measurements prior or subsequent to an experiment on a sample are mainly performed on earth, so that a large inconvenience is caused, thus the precision and efficiency of space experiments are greatly limited.

SUMMARY OF THE INVENTION

Accordingly, the present invention has been made keeping in mind the above problems occurring in the prior art, and an object of the present invention is to provide a mass measurement system and method using inertial force and standard mass in a gravity-free environment, which measure the inertial forces of a sample and a standard sample having known mass that are simultaneously linearly accelerated by a linear acceleration motion unit, and measure mass after acceleration components causing error are eliminated, thus precisely and accurately measuring the mass of a sample for space experiments, for example, a sample having a small mass of 5 kg or less.

Another object of the present invention is to provide a mass measurement system and method using inertial force and standard mass in a gravity-free environment, which measure inertial forces using load cells while exchanging the locations of a sample and a standard sample that are linearly accelerated by a linear acceleration motion unit, and measure the mass of the sample using only standard mass and the inertial forces after acceleration components and load cell characteristic constants that cause error are eliminated, thus more precisely and accurately measuring the mass of a sample.

A further object of the present invention is to provide a mass measurement system and method using inertial force and standard mass in a gravity-free environment, which utilize load cells to measure the inertial forces of a sample and a standard sample, thus promptly measuring the mass of a sample in real time.

In order to accomplish the above objects, the present invention provides a mass measurement system using inertial force and standard mass in a gravity-free environment, comprising a linear acceleration motion unit that is a linear motion driving source, a first load cell fastened to the linear acceleration motion unit to measure an inertial force of a sample caused by linearly accelerated motion of the linear acceleration motion unit, a second load cell fastened to the linear acceleration motion unit while being spaced apart from the first load cell by a predetermined distance, the second load cell measuring an inertial force of a standard sample having a known standard mass caused by the linearly accelerated motion of the linear acceleration motion unit, and a main control unit for calculating and outputting mass of the sample through an arithmetic operation based on the inertial forces, measured by the first and second load cells, and the standard mass, and controlling an entire operation of the system.

Preferably, the mass measurement system may include a first container fastened to the linear acceleration motion unit and having an inner side surface to which the first load cell is fastened, and a second container fastened to the linear acceleration motion unit while being spaced apart from the first container by a predetermined distance, the second container having an inner side surface to which the second load cell is fastened.

Further, the present invention provides a mass measurement method using inertial force and standard mass in a gravity-free environment, comprising a first step of driving a linear acceleration motion unit and applying the same linear acceleration to a sample and a standard sample, a second step of first and second load cells measuring inertial forces of the sample and the standard sample at the first step, respectively, a third step of a main control unit calculating mass of the sample through an arithmetic operation based on known mass of the standard sample and the inertial forces of the sample and the standard sample that are measured by the first and second load cells, respectively, and a fourth step of outputting the mass calculated by the main control unit.

DESCRIPTION OF THE PREFERRED EMBODIMENTS

Hereinafter, a mass measurement system and method using inertial force and standard mass in a gravity-free environment according to embodiments of the present invention will be described in detail with reference to the attached drawings.

Figure 1:
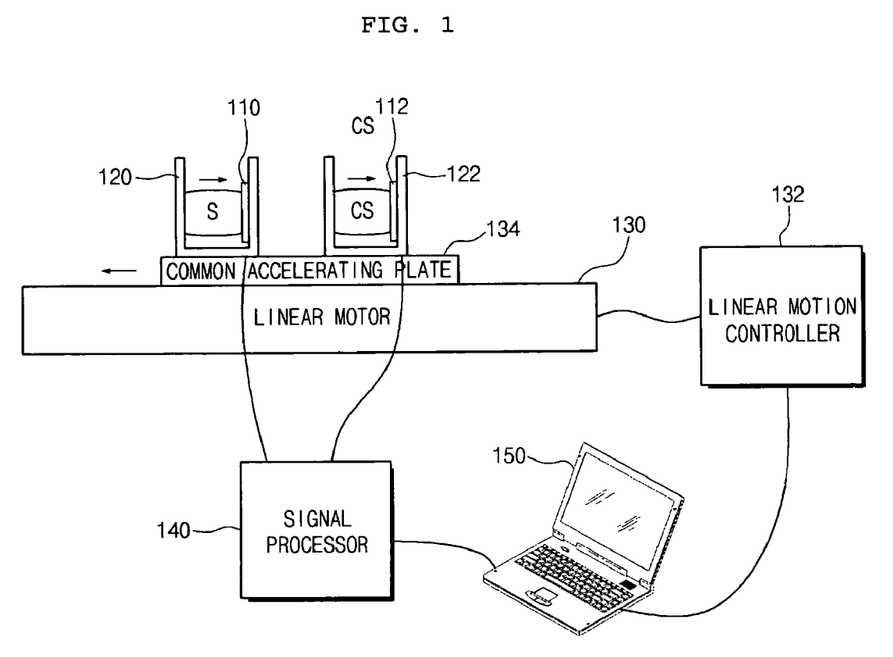
FIG. 1 is a diagram showing the construction of a mass measurement system using inertial force and standard mass in a gravity-free environment according to an embodiment of the present invention.

FIG. 1 is a diagram showing the construction of a mass measurement system using inertial force and standard mass in a gravity-free environment according to an embodiment of the present invention.

The mass measurement system using inertial force and standard mass in a gravity-free environment according to an embodiment of the present invention includes a linear motor 130, a first load cell 110, a second load cell 112, a signal processor 140, a main control unit 150, and a linear motion controller 132.

The linear motor 130 is a linear motion driving source, which performs a linearly accelerated motion under the control of the linear motion controller 132.

The first load cell 110 is fastened to the linear motor 130 to perform a linearly accelerated motion along with the linear motor 130, detects the inertial force of a sample S caused by the linearly accelerated motion of the linear motor 130 as an electrical signal, and outputs the electrical signal.

The second load cell 112 is fastened to the linear motor 130 while being spaced apart from the first load cell 110 by a predetermined distance, performs a linearly accelerated motion along with the linear motor 130, detects the inertial force of a standard sample CS, having a known standard mass, caused by the linearly accelerated motion of the linear motor 130, as an electrical signal, and outputs the electrical signal.

In this case, the "standard mass" means the mass of the standard mass CS.

The signal processor 140 amplifies the electrical signals, which are analog signals received from the first and second load cells 110 and 112, and Analog/Digital (A/D) converts the amplified signals.

The main control unit 150 calculates the mass of the sample S through an arithmetic operation based on the inertial forces of the first and second load cells 110 and 112, received from the signal processor 140, and a stored operation program, displays the mass of the sample S, and controls the operation of the entire system.

In detail, the main control unit 150 includes an input unit (not shown), an operation control unit (not shown), a main storage unit (not shown), an auxiliary storage unit (not shown), and an output unit (not shown). The detailed functions of respective components and the transmission/reception of data and control signals between the components are technologies that can be easily implemented by those skilled in the art on the basis of the technical descriptions disclosed in the present invention, so that a detailed description thereof is omitted.

Further, the auxiliary-storage unit of the main control unit 150 stores therein a program for calculating mass according to an embodiment of the preset invention. The operation program used to implement the present invention is a technology that can be easily implemented by those skilled in the art of program development on the basis of the technical description disclosed in the embodiment of the present invention, so that a detailed description thereof is omitted.

The linear motion controller 132 controls the magnitude and direction of the linearly accelerated motion performed by the linear motor 134 under the control of the main control unit 150.

Preferably, the mass measurement system according to the embodiment of the present invention further includes a first container 120 fastened to the linear motor 130 and having an inner side surface to which the first load cell 110 is fastened, and a second container 122 fastened to the linear motor 130 while being spaced apart from the first container 120 by a predetermined distance, and having an inner side surface to which the second load cell 112 is fastened.

The first and second containers 120 and 122 allow the load cells 110 and 112 to be more easily fastened to the linear motor 130. Further, if the sample is a non-solid material such as liquid, or an animal such as a rat, the first and second containers 120 and 122 function to easily fasten the sample to the load cells 110 and 112 in a gravity-free state.

Further, more preferably, the mass measurement system according to the embodiment of the present invention further includes a common accelerating plate 134 that is interposed between the first and second containers 120 and 122 and the linear motor 130 and has a bottom surface fastened to the linear motor 130 and a top surface fastened to the first and second containers 120 and 122. The common accelerating plate 134 more efficiently and simultaneously transmits the accelerated motion of the linear motor 130 to the first and second containers 120 and 122.

The sample S is an object, the mass of which is to be measured by the mass measurement system of the present invention, and preferably has a small mass of 5 kg or less for space experiments.

The standard sample CS is used to measure the mass of the sample S and has a standard mass. The standard mass, which is the mass of the standard sample CS, is a known value precisely and accurately measured on earth. The known standard mass is data input through the input unit (not shown) of the main control unit 150.

FIGS. 2a and 2b are views showing the detailed construction of the linear motor 130. FIG. 2a is a front view of the linear motor 130, and FIG. 2b is a side view of the linear motor 130.

As shown in FIGS. 2a and 2b, the linear motor 130 according to the embodiment of the present invention includes a mover 210 and a stator 220. The mover 210 and the stator 220 maintain a predetermined gap therebetween due to a roller 230.

Further, the linear motor 130 is constructed so that a driving force is generated between an end 222a of a layered core 222 and a magnetic projection 210a through Fleming's rule by Alternating Current (AC) power that is applied to a coil 221 by a power driver unit (not shown), and then the mover 210 is moved.

Figure 3:
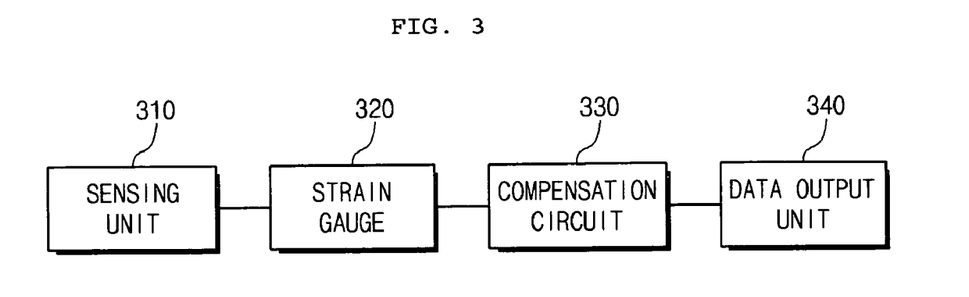
FIG. 3 is a detailed block diagram of a load cell of FIG. 1.

FIG. 3 is a detailed block diagram of the load cells 110 and 112. As shown in FIG. 3, each of the load cells 110 and 112 according to an embodiment of the present invention includes a sensing unit 310 for receiving the inertial force of a sample S or a standard sample CS and generating dynamic strain, a strain gauge 320 for converting the dynamic strain generated by the sensing unit 310 into an electrical signal using variation in electrical resistance, a compensation circuit 330 for compensating for an error occurring in the value output from the strain gauge 320 due to surrounding environments, such as temperature, and a data output unit 340 for outputting an inertial force value corrected by the compensation circuit 330.

Next, a mass measurement method using inertial force and standard mass in a gravity-free environment, performed by the mass measurement system using inertial force and standard mass in a gravity-free environment according to the present invention having the above construction, is described below.

Figure 4:
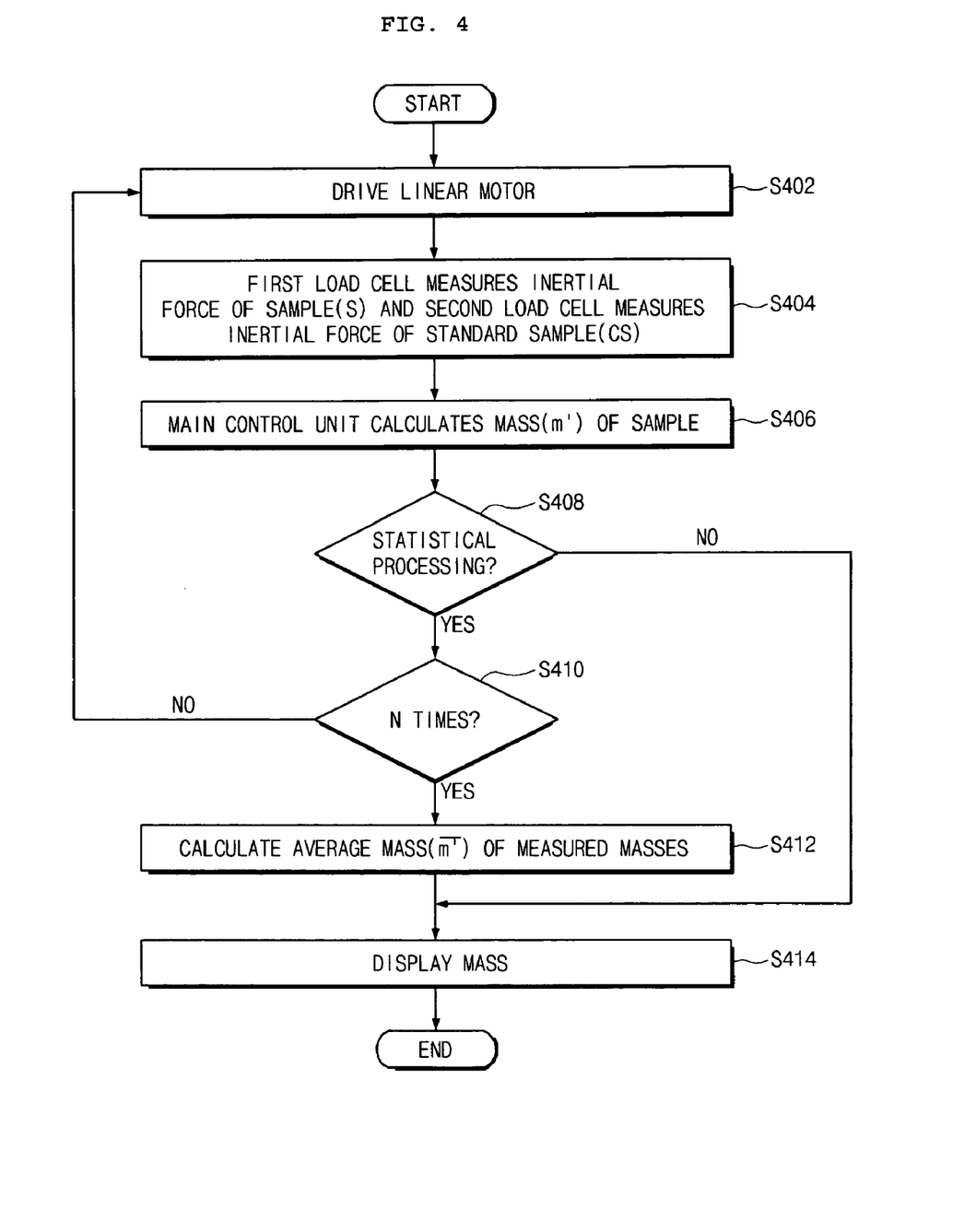
FIG. 4 is a flowchart of a mass measurement method using inertial force and standard mass in a gravity-free environment according to a first embodiment of the present invention.

FIG. 4 is a flowchart of a mass measurement method using inertial force and standard mass in a gravity-free environment according to a first embodiment of the present invention.

First, after a sample S and a standard sample CS are fastened to the load cells 110 and 112 by fixing the sample S and the standard sample CS, for example, animals such as rats, to the first and second containers 120 and 122 to which the load cells 110 and 112 are fastened, or by fastening the sample S and the standard sample CS, for example, a solid, to ends of the load cells 110 and 112, a procedure of calibrating the first and second load cells 110 and 112 is first performed. This procedure is performed to eliminate related error in advance through the calibration of the load cells 110 and 112.

While the sample S is placed in the first container 110, and the standard sample CS is placed in the second container 112, the main control unit 150 outputs a driving control signal to the linear motion control unit 132.

The linear motion controller 132 outputs a driving control signal, used to control acceleration and motion direction, and a motion stop control signal to the linear motor 130 on the basis of the driving control signal from the main control unit 150.

The magnitude of the linearly accelerated motion, output from the linear motion controller 132, is not related to whether the motion is a uniformly accelerated motion, an accelerated motion increasing with the elapse of time, or an accelerated motion increasing after increasing with the elapse of time. However, if the sample S is an animal such as a rat, it is preferable that variation in the magnitude of acceleration applied to the linear motor 130 is not large (gentle variation in acceleration). This is required to prevent stress from being applied to an animal, such as a rat, due to rapid variation in acceleration.

The linear motor 130 performs a linearly accelerated motion on the basis of the control signal received from the linear motion controller 132 at step S402.

If the procedure of the linear motor 130 performing the linearly accelerated motion at step S402 is described in detail, a power driver unit (not shown) in the linear motor 130 outputs AC power on the basis of the control signal output from the linear motion controller 132, and the AC power is applied to the coil 221 of the stator 220.

If the AC power is applied to the coil 221 of the stator 220, a driving force is generated between the end 222a of the layered core 222 and the magnetic projection 210a through Fleming's rule and then the mover 210 starts a linear motion.

Since the linear motor 130, the common accelerating plate 134, the first container 120, the second container 122, the first load cell 110, and the second load cell 112 are in the same inertial system, the common accelerating plate 134, the first container 120, the second container 122, the first load cell 110 and the second load cell 112 also perform the same linearly accelerated motion along with the linearly accelerated motion of the linear motor 130.

Further, when the linear motor 130 performs a linearly accelerated motion at an acceleration of α, the following inertial forces are generated on the sample S and the standard sample CS.

If an inertial force generated on the sample S is $s_1$, and an inertial force generated on the standard sample CS is $s_2$, $s_1$ and $s_2$ can be expressed by the following Equations [1] and [2], $$s_1 = k_1 \cdot m_1 \cdot \alpha \quad [1]$$

$$s_2 = k_2 \cdot m_2 \cdot \alpha \quad [2]$$

where $k_1$ is a characteristic constant of the load cell 110, and $k_2$ is a characteristic constant of the load cell 112, which are known data precisely measured on earth. Further, $m_1$ is the mass of the sample S, and $m_2$ is the standard mass of the standard sample CS.

The sample S and the standard sample CS apply the above inertial forces $s_1$ and $s_2$ to the first load cell 110 and the second load cell 112, respectively. The first load cell 110 and the second load cell 112 sense the inertial forces $s_1$ and $s_2$ applied by the sample S and the standard sample CS, and output the inertial forces $s_1$ and $s_2$ as electrical signals at step S404.

Meanwhile, the process of the first load cell 110 and the second load cell 112 sensing the inertial forces $s_1$ and $s_2$ from the sample S and the standard sample CS and outputting the inertial forces $s_1$ and $s_2$ as electrical signals is the same as that of the construction of the load cells based on FIG. 3, so that a detailed description thereof is omitted.

Of course, the electrical signals for the inertial forces output from the load cells 110 and 112 are values obtained by correcting error components, such as temperature, through the compensation circuit 330.

The signal processor 140, having received the signals output from the first load cell 110 and the second load cell 112, amplifies the received signals, and Analog/Digital (A/D) converts the amplified signals.

The signals processed by and output from the signal processor 140 are input to the main control unit 150, and the main control unit 150, having received the signals, calculates the mass of the sample on the basis of the following Equation [3] at step S406.

$$m_1 = \frac{k_2}{k_1} \cdot \frac{s_1}{s_2} \cdot m_2 \quad [3]$$

In Equation [3], the mass $m_2$ of the standard sample is a known value, which has been previously input through an input unit (not shown) of the main control unit 150 and stored in the main control unit 150. Hereinafter, the mass of the sample S measured at step S406 is referred to as m'.

As indicated in Equation [3], the mass m' of the sample S calculated and measured at step S406 is obtained after a term of linear acceleration α, which is one of factors causing mass measurement error, is eliminated (that is, regardless of the linear acceleration α), so that the precision of measurements is remarkably improved.

Further, if a "statistical processing mode" is set, the main control unit 150 performs the remaining steps, starting from step S410, while if a "statistical processing mode" is not set, the mass m' of the sample S measured at step S406 is displayed through a display unit (not shown) at step S414.

The "statistical processing mode" is a mode for repeatedly performing steps S402 to S406 N times, measuring the mass of the sample, and executing statistical processing, for example, an averaging operation or a linear square operation, on the measured mass m' of the sample S. This mode is set by the main control unit 150.

Further, N, which is the number of repetitions for statistical processing, is also input through an input unit (not shown) of the main control unit 150 and set in the main control unit 150.

If the statistical processing mode is set, steps S402 to S406 are repeatedly performed until the number of repetitions (the number of times the mass m' of the sample S is measured) reaches N.

If the number of times the mass of the sample S is measured reaches N, the main control unit 150 calculates the average $\overline{m'}$ of the masses m' of the sample S using an averaging operation program at step S412, and displays the average through the display unit (not shown) at step S414.

As described above, the mass of the sample is measured through mass measurement using statistical processing, that is, the method of repeatedly performing steps S402 to S406 N times, and averaging the measurement results to measure the mass of the sample, thus improving the precision of measurements.

Next, a mass measurement method according to a second embodiment of the present invention is described.

Figure 5:
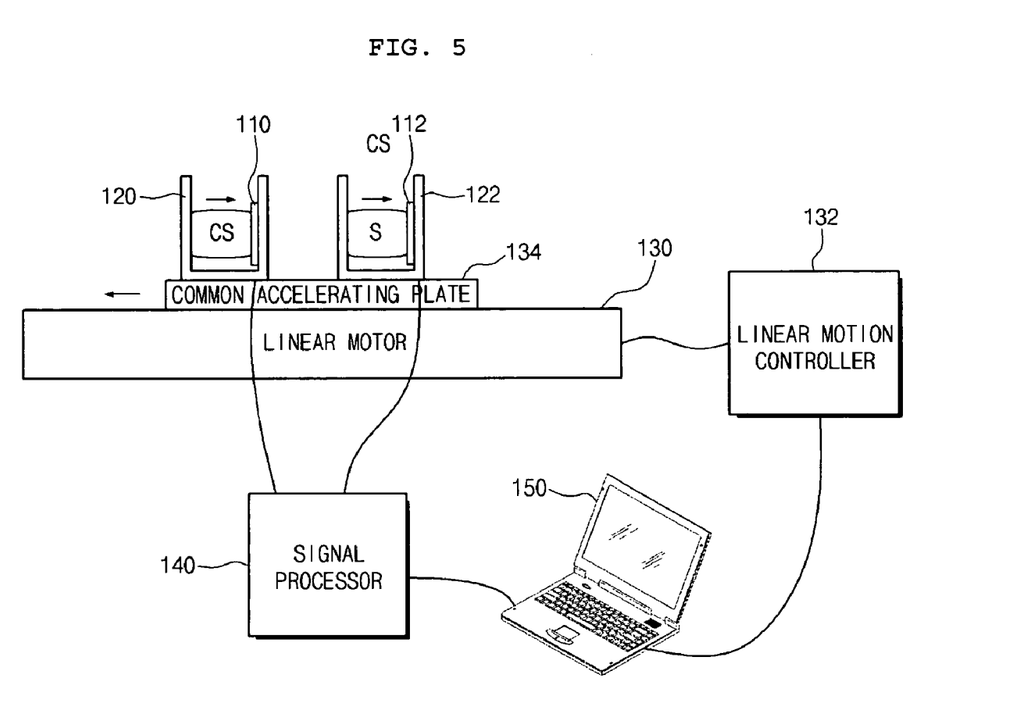
FIG. 5 is a diagram showing the construction for exchange measurement between a sample and a standard sample in the mass measurement system of FIG. 1.
Figure 6:
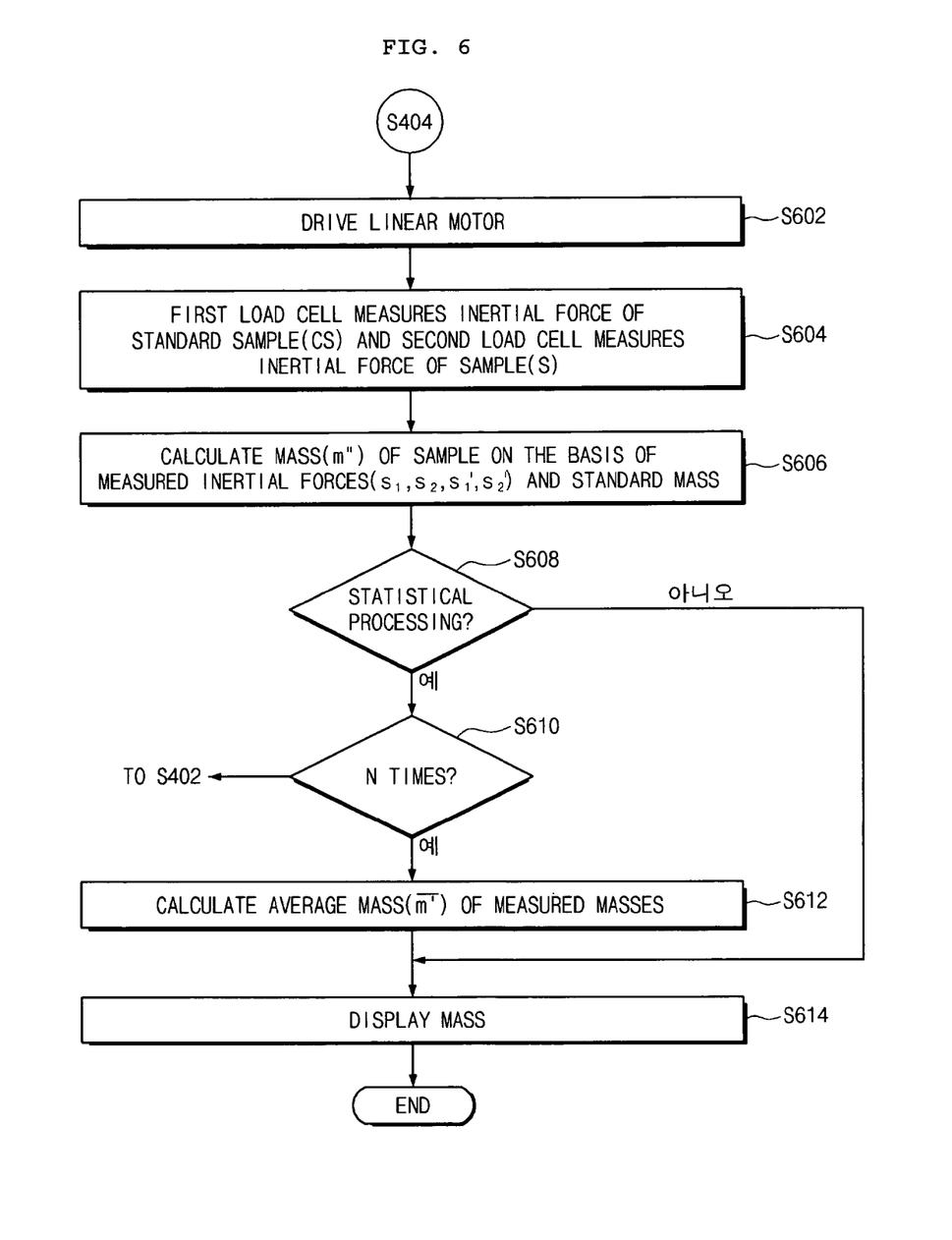
FIG. 6 is a flowchart of a mass measurement method using inertial force and standard mass in a gravity-free environment according to a second embodiment of the present invention.

FIG. 5 is a view showing the construction for exchange measurement for a sample and a standard sample in the mass measurement system of FIG. 1, and FIG. 6 is a flowchart of a mass measurement method using inertial force and standard mass in a gravity-free environment according to a second embodiment of the present invention.

The method of measuring the mass of a sample S shown in FIG. 6 performs the "exchange measurement for the sample S and the standard sample CS" to remove the terms of the characteristic constants $k_1$ and $k_2$ of the load cells, which are other factors causing error in measurements, and measures the mass of the sample S on the basis of the exchange measurement.

The characteristic constants $k_1$ and $k_2$, which are known values precisely measured on earth, are very small, but may actually cause measurement error, and physical properties may be changed in space. Therefore, the mass measurement method according to this embodiment is implemented to leave the characteristic constants $k_1$ and $k_2$ out of consideration at the time of measuring mass, and to measure the mass of the sample.

In the mass measurement method according to the second embodiment of the present invention, the first load cell 110 measures the inertial force of the sample S and the second load cell 112 measures the inertial force of the standard sample CS by performing steps S402 and S404. Thereafter, the locations of the sample S and the standard sample CS are exchanged, as shown in FIG. 5.

In this case, the "exchange of the locations of the sample S and the standard sample CS" means that the sample S is placed in the second container 122, the standard sample CS is placed in the first container 120, the inertial force of the sample S is measured by the second load cell 112, and the inertial force of the standard sample CS is measured by the first load cell 110.

After the inertial forces of the sample S and the standard sample CS are measured at steps S402 and S404, the linear motion controller 132 outputs a driving control signal and drives the linear motor 130 under the control of the main control unit 150 with the locations of the sample S and the standard sample CS exchanged at step S602.

Similar to the first embodiment, the inertial forces in the following Equations [4] and [5] are generated on the standard sample CS and the sample S by the linearly accelerated motion of the linear motor 130 (acceleration at this time is α'), and are measured by the first load cell 110 and the second load cell 112, respectively, at step S604.

The inertial force $s_1'$ measured by the first load cell 110 is expressed by the following Equation [4], $$s_1' = k_1 \cdot m_2 \cdot \alpha' \quad [4]$$

the inertial force $s_2'$ measured by the second load cell 112 is expressed by the following Equation [5], $$s_2' = k_2 \cdot m_1 \cdot \alpha' \quad [5]$$

The first load cell 110 and the second load cell 112 output the measured inertial forces of the standard sample CS and the sample S as electrical signals. The signal processor 140 receives the electrical signals, amplifies the received signals, and A/D converts the amplified signals, similar to the first embodiment.

The signals, processed by and output from the signal processor 140, are input to the main control unit 150. The main control unit 150, having received the signals, calculates the mass of the sample S using a stored operation program based on the following Equation [7] at step S606.

That is, the following Equation [6] is derived from Equations [4] and [5], $$m_1 = \frac{k_1}{k_2} \cdot \frac{s'_2}{s'_1} \cdot m_2 \quad [6]$$

the following Equation [7] is derived from Equations [3] and [6].

$$m_1 = \sqrt{\frac{s_1}{s_2} \cdot \frac{s'_2}{s'_1} \cdot m_2} \quad [7]$$

Hereinafter, the mass of the sample S measured at step S606 is referred to as m".

As indicated in Equation [7], the mass m" of the sample S measured by the main control unit 150 is calculated and measured on the basis of only the inertial forces $s_1$, $s_2$, $s_1'$, and $s_2'$, measured by the two load cells 110 and 112, and a known standard mass $m_2$.

Therefore, the method of measuring the mass of the sample S through the calculation and measurement based on Equation [7] need not consider the characteristic constants $k_1$ and $k_2$ as well as acceleration components α and α' (that is, a mass measurement method irrelevant to the acceleration components α and α' and the characteristic constants $k_1$ and $k_2$ causing error).

Further, similar to the first embodiment, if the statistical processing mode is set, steps S402, S404, S602, S604 and S606 are repeatedly performed N times at steps S608 and S610, and the average $\overline{m''}$ of measured masses is calculated at step S612. Further, the calculated average mass $\overline{m''}$ is displayed through a display unit (not shown) at step S614.

Similar to the first embodiment, statistical processing steps are performed at steps S608 to S612, thus further improving the precision of the measured mass m".

Next, a third embodiment of the present invention is described.

Figure 7:
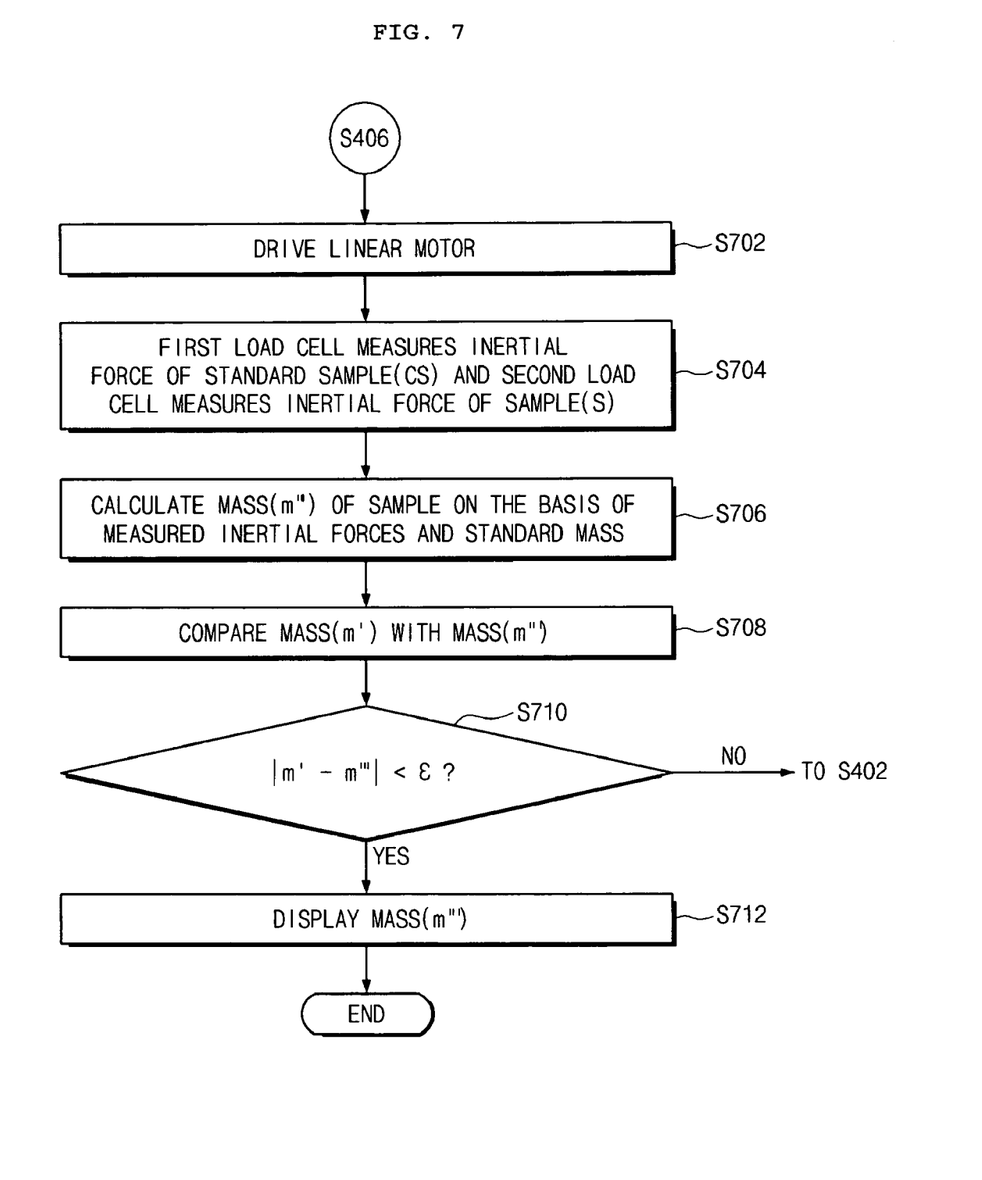
FIG. 7 is a flowchart of a mass measurement method using inertial force and standard mass in a gravity-free environment according to a third embodiment of the present invention.

FIG. 7 is a flowchart of a mass measurement method using inertial force and standard mass in a gravity-free environment according to a third embodiment of the present invention.

The method of measuring the mass of a sample S in FIG. 7 performs "exchange measurement for the sample S and a standard sample CS" and measures the mass of the sample S on the basis of the exchange measurement similar to the second embodiment.

In the mass measurement method according to the third embodiment of the present invention, steps S402 to S406 are performed to measure the mass m' of the sample S, and then the locations of the sample S and the standard sample CS are exchanged, as shown in FIG. 5.

After the mass m' of the sample S is measured by performing steps S402 to S406, the linear motion controller 132 outputs a driving control signal and drives the linear motor 130 under the control of the main control unit 150 with the locations of the sample S and the standard sample CS exchanged at step S702.

Similar to the second embodiment, the first load cell 110 measures the inertial force $s_1'$ of the standard sample CS, and the second load cell 112 measures the inertial force $s_2'$ of the sample S at step S704. The main control unit 150 alculates the mass of the sample S using a stored operation program based on Equation [7] at step S706. Hereinafter, the mass of the sample S measured at step S706 is referred to as m'''.

Meanwhile, the main control unit 150 compares the mass m''' calculated at step S706 with the mass m' calculated at step S406 on the basis of Equation [3] at step S708. If the difference |m'−m'''| between the masses is equal to or greater than a predetermined value ε, the entire process is executed again. Conversely, if the difference |m'−m'''| is less than ε, it is determined that the measured mass is an accurate final mass, and the mass m''' of the sample S measured at step S706 is displayed through a display unit (not shown) at steps S710 and S712.

Next, a method of measuring the mass of a sample according to a fourth embodiment of the present invention is described.

Figure 8:
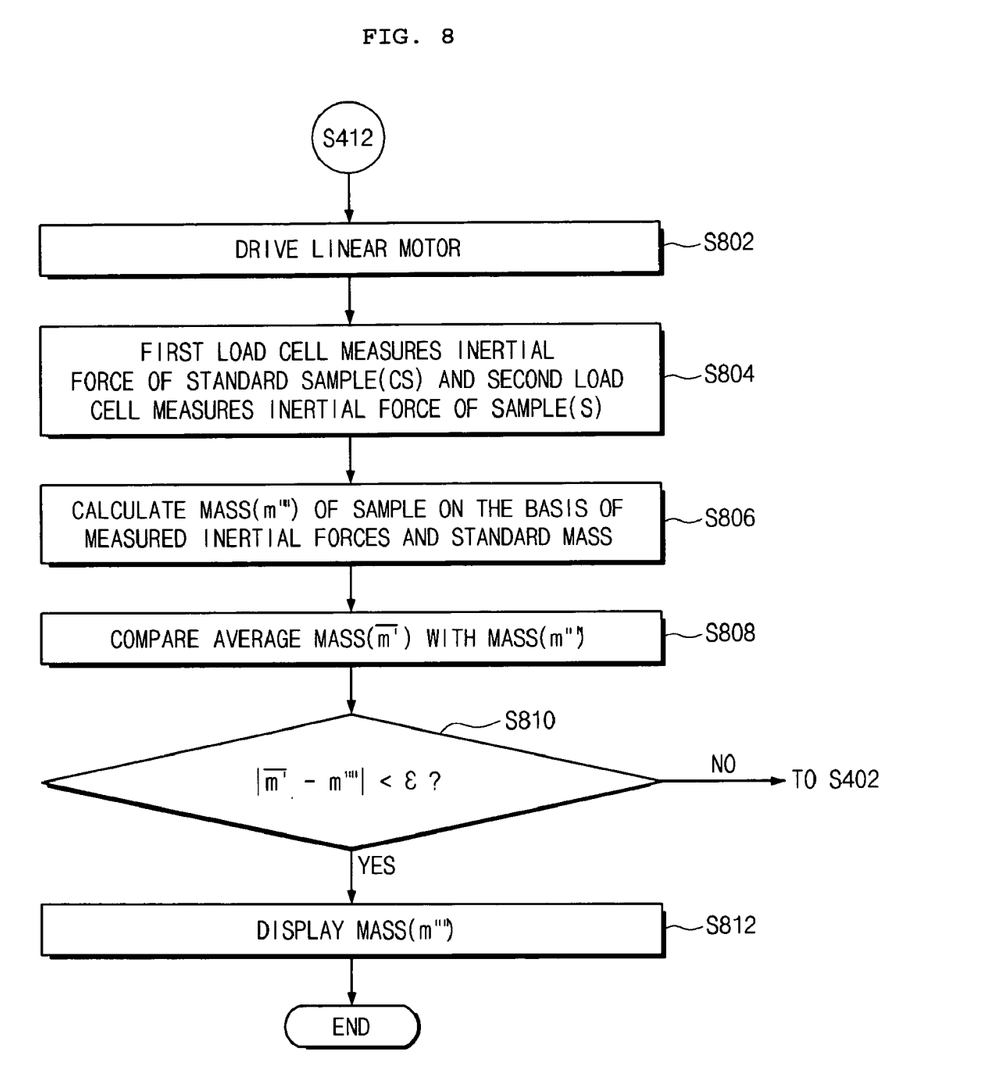
FIG. 8 is a flowchart of a mass measurement method using inertial force and standard mass in a gravity-free environment according to a fourth embodiment of the present invention.

FIG. 8 is a flowchart of a mass measurement method using inertial force and standard mass in a gravity-free environment according to a fourth embodiment of the present invention.

In the mass measurement method according to the fourth embodiment of the present invention in FIG. 8, the average mass $\overline{m'}$ of the masses of the sample S is calculated in a statistical processing mode in the mass measurement method of the first embodiment, and the calculated average mass $\overline{m'}$ is used together with the mass measurement method using the sample exchange measurement of the second and third embodiments.

That is, after the average mass $\overline{m'}$ of the sample S is calculated at steps S402 to S412 in the first embodiment, the locations of the sample S and the standard sample CS are exchanged to measure the mass of the sample as in the second and third embodiments.

First, after the average mass $\overline{m'}$ of the sample S is measured at steps S402 to S412, the linear motion controller 132 outputs a driving control signal and drives the linear motor 130 under the control of the main control unit 150 with the locations of the sample S and the standard sample exchanged at step S802.

Similar to the second and third embodiments, the first load cell 110 and the second load cell 112 measure the inertial forces of Equations [4] and [5] applied by the standard sample CS and the sample S, respectively, at step S804. The measured inertial forces are input to the main control unit 150 through the signal processor 140.

The main control unit 150, having received the inertial forces, calculates the mass of the sample S using a stored operation program based on Equation [7] at step S806. Hereinafter, the mass of the sample S measured at step S806 is referred to as m''''.

Similar to the second and third embodiments, the mass m'''' of the sample S, measured by the main control unit 150, is calculated and measured on the basis of only the inertial forces $s_1$, $s_2$, $s_1'$, and $s_2'$, measured by the two load cells 110 and 112, and the known standard mass $m_2$. Therefore, the mass m'''' of the sample S is a value measured without consideration of the characteristic constants $k_1$ and $k_2$ as well as acceleration components.

Further, the main control unit 150 compares the mass m'''', calculated at step S806, with the average mass $\overline{m'}$, calculated at step S412, at step S808. If the difference therebetween |$\overline{m'}$-m''''| is equal to or greater than a predetermined value $\epsilon$, the entire process is executed again. Conversely, if the difference between calculated masses |$\overline{m'}$-m''''| is less than the predetermined value $\epsilon$, it is determined that the measured mass is an accurate final mass, so that the mass m'''' of the sample S measured at step S806 is displayed through a display unit (not shown) at steps S810 and S812.

As described above, the technical spirit of the mass measurement methods according to the second to fourth embodiments of the present invention is that the mass of the sample S is measured using only the inertial forces $s_1$, $s_2$, $s_1'$ and $s_2'$ of the sample S and the standard sample CS, measured by the load cells 110 and 112, and the known standard mass, regardless of the accelerations $\alpha$ and $\alpha'$ of the linear motor 130 or the characteristic constants $k_1$ and $k_2$ of the load cells.

In the embodiments of the present invention, a linear acceleration motion unit is implemented with the linear motor 130, but it is not limited to the linear motor. It is apparent that any linearly accelerated motion driving source capable of generating a linearly accelerated motion, for example, a cam power transmission unit or a gear power transmission unit, is included in the scope of the present invention.

Figure 2:
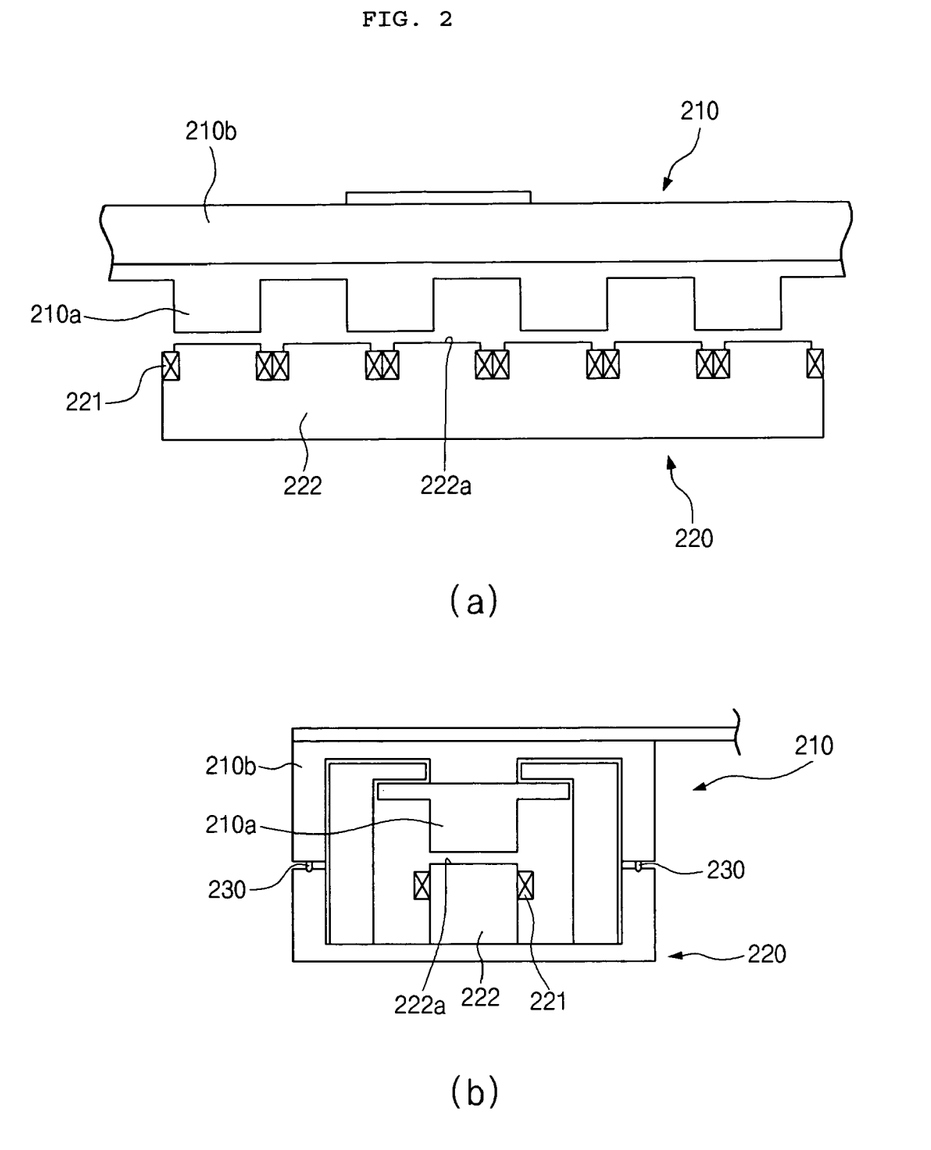
FIGS. 2a and 2b are views showing the detailed construction of a linear motor of FIG. 1.

The construction of the linear motor of FIG. 2 is only an embodiment for implementing the linear motor 130 of the present invention. Further, it is apparent that, even though any typical linear motor, well known to those skilled in the art before the application of the present invention, is employed in addition to the construction of the linear motor of FIG. 2, this construction is also included in the scope of the present invention.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

As described above, a mass measurement system and method using inertial force and standard mass in a gravity-free environment according to the present invention, having the above construction and operation, has the following advantages.

First, the same linearly accelerated motion is simultaneously applied to a sample and a standard sample, the inertial forces of the sample and the standard sample caused by the same linearly accelerated motion are measured, and the mass m' of the sample is calculated on the basis of the inertial forces, so that the present invention can measure the mass of the sample without measuring acceleration, thereby eliminating a cause of error, and consequently improving the precision of mass measurement.

Second, the same acceleration motion is applied to the sample and the standard sample, the inertial forces of the sample and the standard sample caused by the accelerated motion are measured and the mass of the sample is measured, thus the mass of the sample can be promptly measured.

Third, electrical signals, output from load cells for measuring the inertial forces of the sample and the standard sample, are processed and used to measure the mass of the sample, so that the present invention can perform measurement in real time, thus promptly measuring the mass of the sample.

Fourth, since electrical signals, output from load cells for measuring the inertial forces of the sample and the standard sample, are processed and used to measure the mass of the sample, the present invention can repeatedly perform measurements a sufficient number of times within a range of reaction rates of the load cells for a short period of time, and statistically process measured masses, thus further improving the accuracy and precision of mass measurement.

Fifth, as shown in second to fourth embodiments of the present invention, the inertial forces generated from the sample and the standard sample are measured, the locations of the sample and the standard sample are exchanged, and the mass of the sample is measured again on the basis of the inertial forces generated by linearly accelerated motion. Accordingly, the present invention can measure the mass of the sample without considering accelerations $\alpha$ and $\alpha'$ and load cell characteristic constants $k_1$ and $k_2$ that are factors causing error (that is, without measuring the accelerations $\alpha$ and $\alpha'$ and the load cell characteristic constants $k_1$ and $k_2$), thereby remarkably improving the accuracy and precision of mass measurement.

Sixth, the mass of the sample is measured after accelerations and load cell characteristic constants causing error are eliminated, so that the present invention does not require a separate additional device for improving the precision of mass measurement, thus simplifying the construction of a system and miniaturizing the system.

Seventh, as described above, since a mass measurement system is simplified, the reliability of measurements is improved, and development costs are reduced.

Eighth, a mass measurement process is automated by the central control scheme of a main control unit, and calibration is not necessary due to exchange measurements, so that the present invention allows astronauts to more conveniently and simply perform experiments, thus decreasing the amount of work and stress of astronauts.

Ninth, since the acceleration for generating the inertial forces of the sample and the standard sample can be arbitrarily and freely controlled, the present invention can measure the mass of the sample while reducing stress applied to a main measurement object, an animal, thus improving the precision of scientific experiment results.

Tenth, a reliable, simple and small-sized mass measurement device in a gravity-free state is invented, so that in-situ measurements are possible within a spacecraft, unlike a conventional scheme in which a sample and experiment results for space experiments were mainly measured on earth, thus improving the precision and efficiency of space experiments.

What is claimed is:

1. A mass measurement system using inertial force and standard mass in a gravity-free environment, comprising:
    a linear acceleration motion unit that is a linear motion driving source;
    a first load cell fastened to the linear acceleration motion unit to measure an inertial force of a sample caused by linearly accelerated motion of the linear acceleration motion unit;
    a second load cell fastened to the linear acceleration motion unit while being spaced apart from the first load cell by a predetermined distance, the second load cell measuring an inertial force of a standard sample having a known standard mass caused by the linearly accelerated motion of the linear acceleration motion unit; and
    a main control unit for calculating and outputting mass of the sample through an arithmetic operation based on the inertial forces, measured by the first and second load cells, and the standard mass, and controlling an entire operation of the system.

2. The mass measurement system according to claim 1, further comprising a linear motion controller for controlling magnitude and direction of the accelerated motion of the linear acceleration motion unit under the control of the main control unit.

3. The mass measurement system according to claim 2, further comprising a signal processor for converting analog signals, which are the inertial forces measured by the first and second load cells, respectively, into digital signals and outputting the digital signals to the main control unit.

4. The mass measurement system according to claim 3, further comprising a first container fastened to the linear acceleration motion unit and having an inner side surface to which the first load cell is fastened; and a second container fastened to the linear acceleration motion unit while being spaced apart from the first container by a predetermined distance, the second container having an inner side surface to which the second load cell is fastened.

5. The mass measurement system according to claim 1, wherein the linear acceleration motion unit is a linear motor.

6. The mass measurement system according to claim 5, further comprising a common accelerating plate interposed between the linear motor and the first and second containers, the common accelerating plate having a bottom surface fastened to the linear motor and a top surface fastened to the first and second containers.

7. A mass measurement method using inertial force and standard mass in a gravity-free environment, comprising:
   a first step of driving a linear acceleration motion unit and applying the same linear acceleration to a sample and a standard sample;
   a second step of first and second load cells measuring inertial forces of the sample and the standard sample at the first step, respectively;
   a third step of a main control unit calculating mass of the sample through an arithmetic operation based on known mass of the standard sample and the inertial forces of the sample and the standard sample that are measured by the first and second load cells, respectively; and
   a fourth step of outputting the mass calculated by the main control unit.

8. The mass measurement method according to claim 7, further comprising, between the third and fourth steps, the steps of:
   repeatedly performing the first to third steps N (N is a natural number) times; and
   the main control unit calculating an average of masses of the sample calculated N times.

9. The mass measurement method according to claim 7, further comprising, between the second and fourth steps, the steps of:
   a) driving the linear acceleration motion unit and applying the same acceleration to the sample and the standard sample;
   b) the first and second load cells measuring inertial forces of the standard sample and the sample at step a), respectively; and
   c) the main control unit calculating mass of the sample through an arithmetic operation based on the inertial forces, measured at step b) and the second step, and the mass of the standard sample.

10. The mass measurement method according to claim 9, further comprising, between the step c) and the fourth step, the steps of:
    repeatedly performing the first step to the step c) N times; and
    the main control unit calculating an average of masses of the sample calculated N times.

11. The mass measurement method according to claim 7, further comprising, after the third step, the steps of:
    A) driving the linear acceleration motion unit and applying the same acceleration to the sample and the standard sample;
    B) the first and second load cells measuring inertial forces proportional to masses of the standard sample and the sample, respectively;
    C) the main control unit calculating mass of the sample through an arithmetic operation based on the inertial forces, measured at step B) and the second step, and the mass of the standard sample;
    D) the main control unit calculating a difference between the mass calculated at step C) and the mass calculated at the third step; and
    E) outputting the mass calculated at step C) if the difference is less than a predetermined value, while returning to the first step if the difference is equal to or greater than the predetermined value.

12. The mass measurement method according to claim 8, further comprising, after the sample average mass calculation step, the steps of:
    a-1) driving the linear acceleration motion unit and applying the same acceleration to the sample and the standard sample;
    b-1) the first and second load cells measuring inertial forces proportional to the masses of the standard sample and the sample, respectively;
    c-1) the main control unit calculating mass of the sample through an arithmetic operation based on the inertial forces, measured at step b-1) and the second step, and the mass of the standard sample;
    d-1) the main control unit calculating a difference between the mass calculated at step c-1) and the average mass; and
    e-1) returning to the first step if the difference is equal to or greater than a predetermined value, while outputting the mass calculated at step c-1) if the difference is less than the predetermined value.

13. The mass measurement system according to claim 2, wherein the linear acceleration motion unit is a linear motor.

14. The mass measurement system according to claim 13, further comprising a common accelerating plate interposed between the linear motor and the first and second containers, the common accelerating plate having a bottom surface fastened to the linear motor and a top surface fastened to the first and second containers.

15. The mass measurement system according to claim 3, wherein the linear acceleration motion unit is a linear motor.

16. The mass measurement system according to claim 15, further comprising a common accelerating plate interposed between the linear motor and the first and second containers, the common accelerating plate having a bottom surface fastened to the linear motor and a top surface fastened to the first and second containers.

17. The mass measurement system according to claim 4, wherein the linear acceleration motion unit is a linear motor.

18. The mass measurement system according to claim 17, further comprising a common accelerating plate interposed between the linear motor and the first and second containers, the common accelerating plate having a bottom surface fastened to the linear motor and a top surface fastened to the first and second containers.

* * * * *